United States Patent [19]
Ellis

[11] 3,802,764
[45] Apr. 9, 1974

[54] COMBINER MOUNTING FOR HEAD-UP DISPLAY

[75] Inventor: Stafford Malcolm Ellis, Maidstone, England

[73] Assignee: Elliot Brothers (London) Limited, London, England

[22] Filed: July 19, 1972

[21] Appl. No.: 273,102

[30] Foreign Application Priority Data
July 23, 1971 Great Britain .................. 34641/71

[52] U.S. Cl. ................. 350/174, 350/289, 356/251
[51] Int. Cl. .......................................... G02b 27/14
[58] Field of Search ........... 350/174, 289; 356/251, 356/252

[56] References Cited
UNITED STATES PATENTS

| | | | |
|---|---|---|---|
| 3,415,951 | 12/1968 | Heller | 350/174 X |
| 3,552,828 | 1/1971 | Lawrence et al. | 350/174 |
| 2,660,087 | 11/1953 | Domeshek | 350/174 X |
| 1,615,216 | 1/1927 | Cruger | 350/87 |
| 3,087,154 | 4/1963 | Kuecken | 350/174 X |

*Primary Examiner*—David H. Rubin
*Attorney, Agent, or Firm*—Kirschstein, Kirschstein, Ottinger & Frank

[57] ABSTRACT

A mounting arrangement for a combiner of a head-up display unit comprising a linear bearing arrangement which permits rectilinear movement of the combiner.

6 Claims, 1 Drawing Figure

PATENTED APR 9 1974  3,802,764
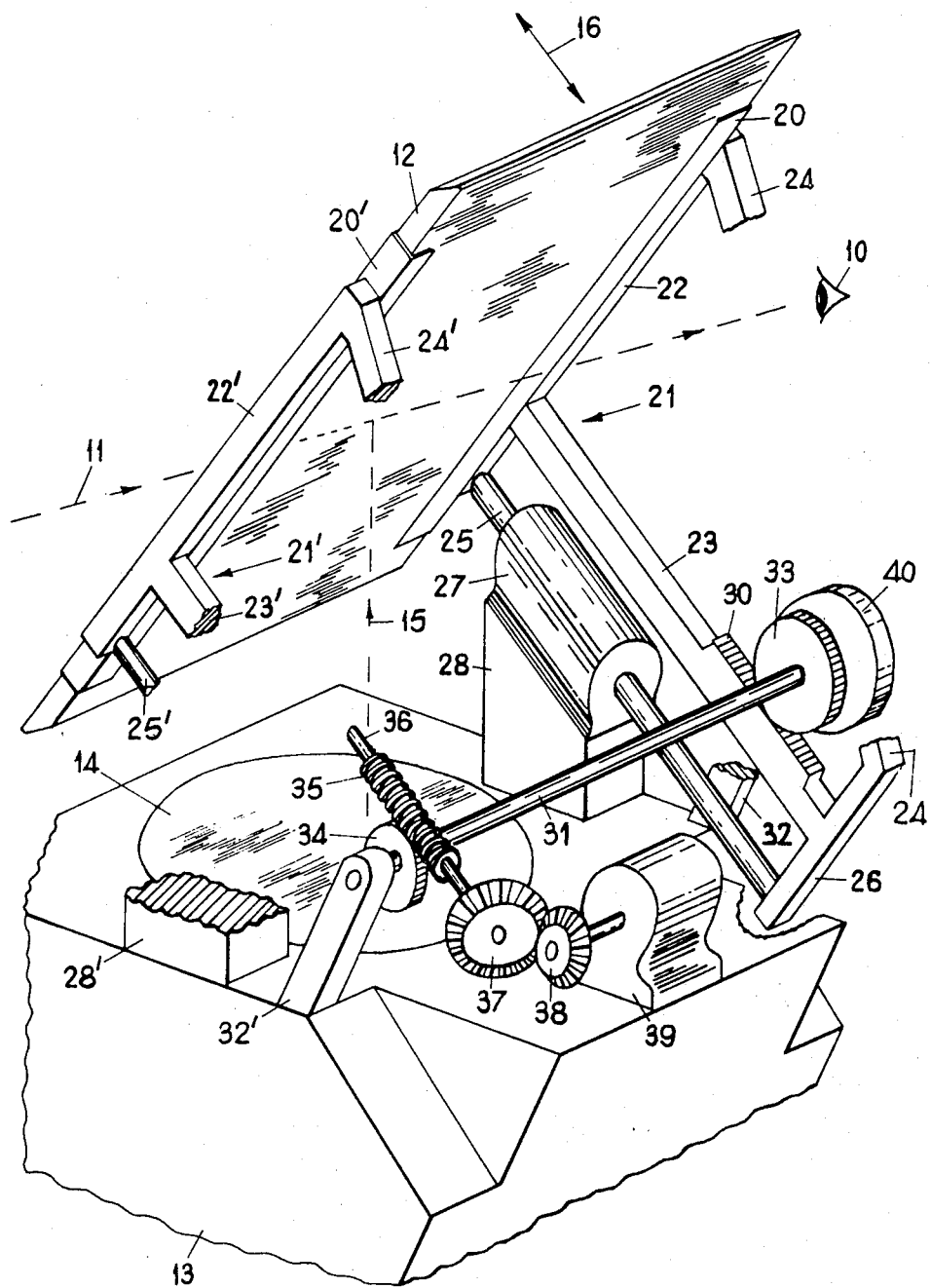

COMBINER MOUNTING FOR HEAD-UP DISPLAY

This invention relates to head-up display units for aircraft.

Such units incorporate a combiner comprising a semi-reflective element through which the pilot can look at the scene in front of the aircraft, while a display produced by the display unit is reflected by the combiner so that the display appears to be superposed on the actual scene in front of the aircraft. For various reasons, the combiner in such units is normally too small to cover the whole of the area in which combination of the actual scene and the display is desired. This has been overcome by mounting the combiner movably, and shifting it in accordance with the position of the most important information to be displayed, so that this information is reasonably well centred in the combiner. A specific mounting previously proposed comprises two parallel links of equal length on each side of the combiner, the links being pivoted to permit movement of the combiner, with spring means to hold the combiner in either of two positions. Such an arrangement is described in United Kingdom Pat. specification No. 1,213,298.

According to the present invention a mounting arrangement for a combiner of a head-up display unit comprises a linear bearing arrangement which permits rectilinear movement of the combiner.

Preferably the bearing arrangement includes two parallel rods arranged to slide in respective linear bearings.

In one such arrangement each rod is secured to the combiner and each linear bearing is secured to the main part of the display unit. The two rods are suitably respectively secured to two frames supporting opposite sides of the combiner.

A mounting arrangement in accordance with the invention suitably includes a rack and pinion arrangement for effecting desired movement of the combiner. The rack and pinion arrangement may be adapted for manual and/or motor-driven operation. The rack and pinion arrangement typically includes a separate rack and pinion for each said rod, and the two racks are suitably respectively carried on two frames supporting opposite sides of the combiner.

Other features of the invention will become apparent from the following description of an embodiment thereof, given by way of example, with reference to the accompanying drawing, which is a perspective view of part of an aircraft head-up display unit, simplified and partially broken away.

Referring to the drawing, the pilot's head normally faces in the direction indicated by the conventional eye 10. Light 11 from the scene in front of the aircraft reaches the pilot by passing through the combiner 12. The main part of the display unit 13 produces a display, light from which passes out through a porthole 14 in a generally vertical direction. This light 15 is reflected by the combiner 12 to the pilot.

In practice, the angle which the combiner 12 subtends to the pilot is fairly small, e.g. 15°, while a somewhat larger angle, e.g. 18°, is desirable. To overcome this deficiency of angle, the combiner 12 is mounted so that it can be moved in the direction of the double arrow 16, i.e., perpendicular to its plane. The area over which coincidence of the actual scene and the display from the main part of the unit 13 is required at any particular instant is of fairly small angular extent, so that movement of the combiner 12 permits the display to be centred in the combiner.

The combiner 12 is mounted in two channel section members 20, 20' by resilient material, so that differential thermal expansion between the combiner 12 and the members 20 does not introduce serious strains. (In the drawing, elements duplicated on the right and left of the assembly are given the same reference numbers, the left-hand elements being distinguished by primes. Several elements are cut away or omitted, for the sake of clarity in the drawing.) The two channel section members 20, 20' are mounted on respective frames 21, 21' of generally triangular shape; member 20 is rigidly fixed to side 22 of frame 21, while member 20' is held on side 22' of frame 21' by means, e.g. sliding studs, which permit member 20' to move in the plane of the combiner 12 perpendicular to member 20', so that the combiner 12 is kept strain-free.

The frame 21 has a second side 23 perpendicular to side 22, and its third side 24 maintains the frame rigid. A rod 24 is held, between side 22 and an extension 26 at the opposite vertex of the frame, parallel to side 23; this rod 25 passes through a linear bearing 27 which is supported by mounting means 28 on the upper face of the main part of the display unit 13. The bearing 27 may, for example, comprise two recirculating ball bearings. Frame 21' is similar and similarly mounted, and rectilinear motion of the combiner 12 is thereby ensured.

Side 23 of frame 21 carries a rack 30. A pinion shaft 31, perpendicular to the side 23, is supported across the display unit 13 between two brackets 32 and 32', and carries a pinion 33 meshing with the rack 30. The shaft 31 also carries a gear 34 which meshes with a worm gear 35, carried on a shaft 36 supported substantially parallel to the sides 23 by bearings (not shown) on the main part of the display unit 13. Shaft 36 carries at its end a bevel gear 37 meshing with a bevel gear 38 driven from a motor 39 mounted on the main part of the display unit 13. The pinion shaft 31 also carries a second pinion (not shown) meshing with a rack (not shown) on frame 21'.

The motor 39 incorporates a tachogenerator. By operating the motor, a drive is transmitted through the bevel gears 38 and 37, the shaft 36, and the worm and gear 35 and 34 to the shaft 31, and thence through the rack and pinion gears (30 and 33 for frame 21) to the frames 21 and 21'. The combiner 12 is thereby driven in the direction of the arrow 16; the tachogenerator in the motor 39 gives a feedback signal by means of which the position of the combiner 12 can be determined.

The gear 34 is not fixed rigidly to the shaft 31; instead, it is held between two discs (not shown) fixed to the shaft by means of friction material. If, by some error, the motor 39 continues to run after the combiner 12 has been driven to either limit of its travel, the gear 34 will slip on the shaft 31, so that neither the mounting of the combiner 12 nor the motor 39 will be damaged. The worm and gear linkage 35, 34 also ensures that there can be no reverse drive from the combiner 12 back to the motor 39. The shaft 31 carries a knob 40 at one end which can be turned by hand (with slippage at gear 34), thus permitting a manual over-ride of the motor control of the combiner.

I claim:

1. A head-up display unit comprising:

A. a substantially planar combiner through which a scene may be viewed by an observer;
B. means for producing a display which is reflected by the combiner so that the display appears to the observer to be superimposed on the scene;
C. frame means for supporting the combiner relative to a main part of the unit which houses said means for producing a display; and
D. an arrangement for mounting the frame means on said main part of the unit; said mounting arrangement including
  i. two parallel rods
    a. which extend in directions substantially perpendicular to the plane of the combiner and
    b. are arranged to slide in respective linear bearings
    c. so as to permit only rectilinear movement of the combiner relative to said main part of the unit in a direction substantially perpendicular to the plane of the combiner.

2. A unit according to claim 1 wherein each rod is secured to the frame means and each linear bearing is secured to said main part of the display unit.

3. A unit according to claim 2 wherein the two rods are respectively secured to frame members supporting opposite sides of the combiner.

4. A unit according to claim 1 including a rack and pinion arrangement for effecting movement of the combiner relative to said main part of the unit.

5. A unit according to claim 4 wherein the rack and pinion arrangement includes a separate rack and pinion for each said rod.

6. A unit according to claim 5 wherein the two racks are respectively carried on two frame members supporting opposite sides of the combiner.

* * * * *